(12) United States Patent
Chen et al.

(10) Patent No.: US 8,442,431 B2
(45) Date of Patent: May 14, 2013

(54) BROADCAST MESSAGE TRANSMISSION METHOD OF RELAY STATION IN MULTI-HOP RELAY NETWORK

(75) Inventors: Yuqin Chen, Shenzhen (CN); Hongyun Qu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 471 days.

(21) Appl. No.: 12/745,205

(22) PCT Filed: Mar. 13, 2008

(86) PCT No.: PCT/CN2008/070494
§ 371 (c)(1),
(2), (4) Date: May 27, 2010

(87) PCT Pub. No.: WO2009/086744
PCT Pub. Date: Jul. 16, 2009

(65) Prior Publication Data
US 2010/0304667 A1    Dec. 2, 2010

(30) Foreign Application Priority Data

Jan. 10, 2008 (CN) .......................... 2008 1 0003909

(51) Int. Cl.
*H04B 7/15* (2006.01)
(52) U.S. Cl.
USPC ............................ 455/11.1; 455/13.1; 455/16
(58) Field of Classification Search ............... 455/3.02, 455/427, 428, 430, 431, 7–9, 11.1, 12.1, 455/13.1, 13.2, 14–17; 340/425.1; 370/226, 370/293, 246, 274, 279, 315, 316, 492, 501
See application file for complete search history.

(56) References Cited

U.S. PATENT DOCUMENTS

| | | | |
|---|---|---|---|
| 2006/0120397 A1* | 6/2006 | Kreiner et al. | 370/437 |
| 2007/0081507 A1 | 4/2007 | Koo et al. | |
| 2007/0104127 A1* | 5/2007 | Suh et al. | 370/328 |
| 2007/0104223 A1 | 5/2007 | Lee et al. | |

(Continued)

FOREIGN PATENT DOCUMENTS

| | | |
|---|---|---|
| CN | 1941666 | 4/2007 |
| CN | 1992922 | 7/2007 |

(Continued)

OTHER PUBLICATIONS

International Preliminary Report on Patentability for PCT/CN2008/070494, dated Jul. 13, 2010.

(Continued)

*Primary Examiner* — Dominic E Rego
(74) *Attorney, Agent, or Firm* — Oppedahl Patent Law Firm LLC

(57) ABSTRACT

A broadcast message transmission method of a relay station in a multi-hop relay network, which can be applied to a non-transparent centralized scheduling multi-hop relay network, includes that a base station transmits a message to be broadcasted to the relay station, the relay station returns an acknowledgement header to the base station after it has received the message, the base station transmits a message indicating the bandwidth allocation of the downlink to the relay station periodically after it has received the acknowledgement header for indicating the downlink bandwidth that the base station initiatively allocates to the relay station, and the relay station transmits broadcast messages to a terminal or a lower relay station in the downlink bandwidth.

21 Claims, 2 Drawing Sheets

U.S. PATENT DOCUMENTS

| | | | | |
|---|---|---|---|---|
| 2007/0298778 | A1* | 12/2007 | Chion et al. | 455/422.1 |
| 2008/0049718 | A1* | 2/2008 | Chindapol et al. | 370/351 |
| 2008/0212466 | A1* | 9/2008 | Hsieh et al. | 370/229 |
| 2008/0214105 | A1* | 9/2008 | Hsu et al. | 455/7 |
| 2008/0268855 | A1* | 10/2008 | Hanuni et al. | 455/445 |

FOREIGN PATENT DOCUMENTS

| | | |
|---|---|---|
| CN | 101009612 | 8/2007 |
| EP | 1 773 091 | 4/2007 |
| EP | 1 940 185 | 7/2008 |

OTHER PUBLICATIONS

English Translation of Written Opinion of the International Searching Authority for Intl. Pat. Appln. No. PCT/CN2008/070494, mailed Oct. 23, 2008.

International Search Report for Intl. Appln. No. PCT/CN2008/070494, mailed Oct. 23, 2008.

\* cited by examiner

BROADCAST MESSAGE TRANSMISSION METHOD OF RELAY STATION IN MULTI-HOP RELAY NETWORK

CROSS-REFERENCED TO RELATED APPLICATIONS

This application is a national stage application of International Application Serial No. PCT/CN2008/070494, filed on Mar. 13, 2008, which claims the benefit of priority to Chinese Application No. 200810003909.7, filed on Jan. 10, 2008, the contents of which are hereby incorporated by referenced in their entireties.

TECHNICAL FIELD

The present invention relates to the field of communications, and more particularly, to a broadcast message transmission method of a relay station in a non-transparent centralized scheduling multi-hop relay network.

BACKGROUND

As shown in FIG. 1, in a multi-hop relay system, one or more Relay Stations (RSs) are set between Multi-hop Base Stations (MR-BSs) and Mobile Stations (MSs), so as to get extended coverage scope and expanded system capacity through relay transmission of signals of a base station and a terminal by the relay station. To meet the requirements of different application scenarios, the relay station may be set as a fixed relay station or a mobile relay station. Based on the situation whether prefixes and control messages are generated and transmitted, the relay station may be classified as a transparent relay station or a non-transparent relay station, and the former does not generate or transmit any prefix or control message. The multi-hop base station is called a base station for short hereinafter.

In a multi-hop relay network, a transmission link from a terminal to a base station via a relay station is composed of an access link and a relay link. Wherein, the access link is a communication link starting from or ending at the terminal, which may be either a link between the terminal and the base station that is directly connected with this terminal, or a link between the terminal and the relay station that is connected with this terminal. The relay link is a link between the base station and the relay station that is connected with this base station or a communication link between two relay stations. The relay station directly connected with the terminal is called an access relay station.

As to centralized scheduling, the base station allocates resources to the access link and the relay link of a multi-hop relay cell uniformly and generates a corresponding MAP (mapping message), or the relay station generates its own MAP according to indication information of the base station. As to distributed scheduling, the base station and the relay station respectively determine resource allocation to sub-relay station or the terminal and generate a corresponding MAP. The present invention can be applied to a non-transparent centralized scheduling multi-hop relay network.

In the case of a non-transparent relay station, the frame structure of the base station and that of the relay station respectively comprise an uplink subframe and a downlink subframe, and each uplink subframe and each downlink subframe are composed of an access zone and a relay zone respectively. Wherein, the access zone is used for access link transmission, and the relay zone is used for relay link transmission. A relay MAP refers to the MAP message sent by the base station or the relay station in the relay zone.

In the non-transparent centralized scheduling multi-hop relay network, a DCD (Downlink Channel Description)/UCD (Uplink Channel Description) broadcast message sent by the relay station via broadcast is generated by the base station. The base station sends the generated relay station broadcast message to the relay station at a primary management CID (connection ID) or a multicast management CID of the relay station, and the relay station reads MAC (Media Access Control) header information after receiving the message, finding that this message is a DCD/UCD message that is to be sent to a lower station, and then returns an acknowledgement header indicating that this message is well received. Every message is corresponding to one acknowledgement header. If the base station has not received the acknowledgement header when the timer is out, a management message should be sent again. Every time before sending this message down to the lower station periodically, the relay station sends a bandwidth request header to the base station to request for a downlink bandwidth, and the base station allocates a proper bandwidth to the relay station through a MAP IE, and then the relay station forwards the DCD/UCD within this bandwidth using a segmentable broadcast CID.

The existing technical scheme bears two disadvantages, one is that the bandwidth request header sent every time brings too large overhead, and the other is that it cannot be guaranteed that there is an available downlink bandwidth to be allocated to the relay station immediately after the base station has received the bandwidth request, and therefore bringing a long time delay.

SUMMARY

The technical problem the present invention aims to solve is to provide a broadcast message transmission method of a relay station in a multi-hop relay network, so as to reduce the system overhead and the time delay.

To solve the above-mentioned technical problem, the present invention provides a broadcast message transmission method of a relay station in a multi-hop relay network, applied in a non-transparent centralized scheduling multi-hop relay network, comprising:

a base station sends a message to be broadcasted to a relay station, the relay station returns an acknowledgement header to the base station after receiving the message, the base station sends messages indicating the bandwidth allocation of downlink to the relay station periodically after receiving the acknowledgement header, and the messages are used to indicate the downlink bandwidth that the base station allocates initiatively to the relay station; the relay station sends broadcast messages to a terminal or a lower relay station within the downlink bandwidth.

Further, the step that the base station sends messages indicating the bandwidth allocation of the downlink to the relay station periodically after receiving the acknowledgement header may mean:

after receiving the acknowledgement header, the base station allocates the downlink bandwidth to the relay station periodically and sends messages indicating the bandwidth allocation of the downlink to the relay station according to a periodical sending interval at which the relay station sends broadcast messages, and the periodical sending interval at which the relay station broadcasts messages is defined during initial setting of the relay station or is informed to the base station during basic capability negotiation.

Further, the acknowledgement header returned to the base station by the relay station may include message types and configuration change counting values, if the base station finds that the broadcast message of the relay station is changed or the base station does not receive any acknowledgement header within a predefined time, the base station will resend a message to be broadcasted to the relay station.

Further, a type indicator may be added to the message indicating the bandwidth allocation of the downlink, and is used to denote that this message has indicated the downlink bandwidth allocated initiatively to the relay station by the base station.

Further, the message indicating the bandwidth allocation of the downlink may further include sent message types, which are used to indicate the types of the broadcast messages sent by the relay station within a corresponding downlink bandwidth.

Further, the message indicating the bandwidth allocation of the downlink may further include one or both of the following fields:

a DL-MAP IE index number, used to indicate a position of a burst where the broadcast message sent to the terminal by the relay station is located;

an R-DL-MAP IE index number, used to indicate a position of a burst where the broadcast message sent to the lower relay station by the relay station is located.

Further, when the DL-MAP IE index number is k, after receiving the message indicating the bandwidth allocation of the downlink, the relay station may send messages in the burst indicated by the $k^{th}$ DL-MAP IE message of DL-MAP messages in the next available frame, and the frame number of the next available frame is defined in an RS_RLY_MAP message.

Further, when the R-DL-MAP IE index number is k, after receiving the message indicating the bandwidth allocation of the downlink, the relay station may send messages in a burst indicated by the $k^{th}$ R-DL-MAP IE message of R-DL-MAP messages in a next available frame, and the frame number of the next available frame is defined in the RS_RLY_MAP message.

Further, the messages indicating the bandwidth allocation of the downlink may be an RS_BW_ALLOC_IE message.

Further, the broadcast message may include any one or several of the following messages:

a DCD message, or a UCD message, or an MOP_NBR-ADV message.

By adopting the method disclosed in the present invention, less overhead will be brought by the relay station when it sends management messages such as a DCD/UCD, and it is guaranteed that the bandwidth for sending these management messages can be allocated in time, thus the time delay is reduced.

BRIEF DESCRIPTION OF THE DRAWINGS

The drawings illustrated hereby, as one part of this application, are used for providing further understanding of the present invention, and the exemplary embodiments and illustrations thereof are used to explain the present invention, but are not to confine the present invention improperly. In the drawings.

DETAILED DESCRIPTION

The technical scheme of the present invention will be described in further detail with reference to drawings and embodiments hereinafter.

As mentioned above, after receiving management messages such as a DCD/UCD, the relay station stores them, and broadcasts them to the terminal or lower relay stations on the downlink periodically. In order to reduce overhead and guarantee to allocate the bandwidth timely, the present invention holds that, the base station initiatively allocates the bandwidth to the relay station for sending broadcast messages on the downlink, rather than that the relay station requests to the base station for the bandwidth every time before sending the broadcast messages.

The periodical sending interval at which the relay station broadcasts messages is defined during initial setting of the relay station or is informed to the base station during basic capability negotiation. The base station initiatively allocates the downlink bandwidth to the relay station periodically according to the periodical sending interval at which the relay station broadcasts messages, and the allocated bandwidth is indicated by a specific MAP IE (mapping message indicating element), which indicates message types of the allocated resource blocks via certain fields.

If management messages such as a DCD/UCD broadcasted by the relay station are changed, the base station will change the "configuration change counting" field thereof and resend the messages to the relay station, while the relay station receives and stores the new management messages such as a DCD/UCD before re-executing the above mentioned sending process.

With reference to the drawings, the present invention will be illustrated by taking a multi-hop relay network defined in IEEE802.16j for example.

Figure 1:
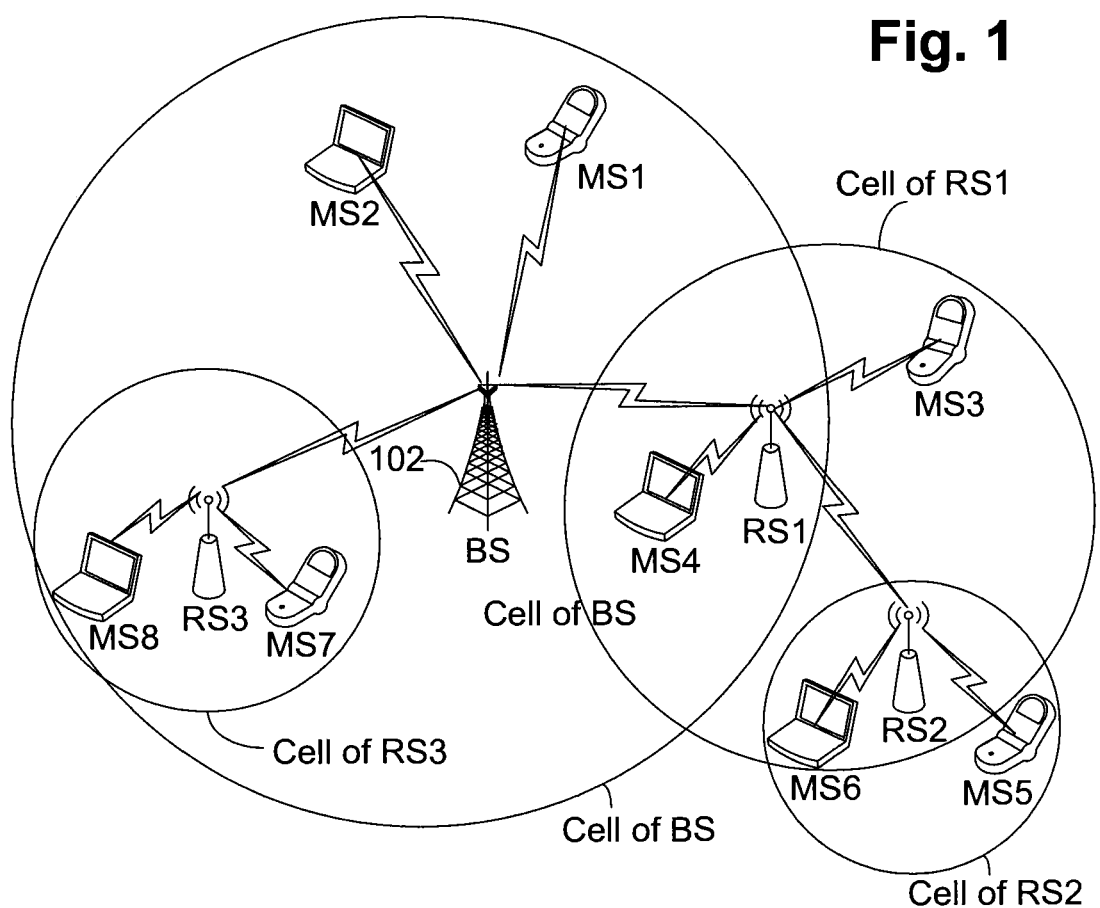
FIG. 1 is a schematic diagram illustrating a radio multi-hop relay network.

In the multi-hop relay network, signals between the base station and the terminal are transmitted via a single-hop or multi-hop relay. As shown in FIG. 1, there is a relay station RS3 on the transmission path between the base station BS and the mobile station MS7, and there are two relay stations RS1 and RS2 on the transmission path between the base station BS and the mobile station MS5.

Figure 2:
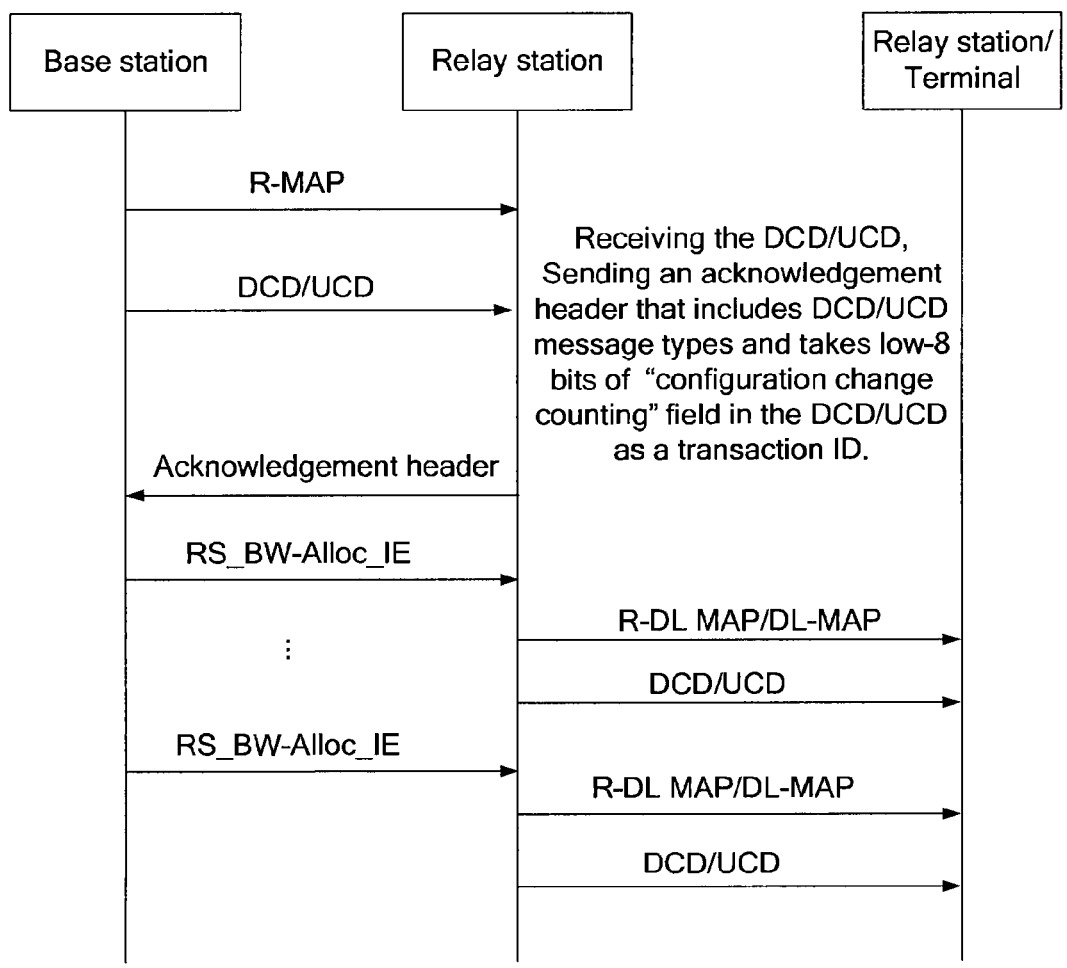
FIG. 2 is a flowchart illustrating the transmission of DCD/UCD broadcast messages of the relay station in a multi-hop relay network.

Under the centralized scheduling mode, the transmission process of DCD/UCD broadcast messages of the relay station in the multi-hop relay network is as shown in FIG. 2, including the following steps:

step 210, a base station generates a DCD/UCD message that a relay station is to broadcast on a downlink, and sends the message to the relay station in a relay zone by using a resource block indicated by a relay MAP;

step 220, after receiving the message, the relay station returns an acknowledgement header indicating that the DCD/UCD message has been received; wherein the acknowledgement header includes DCD/UCD message types and takes the low-8 bits in the "configuration change counting" field in the DCD/UCD as a transaction ID;

in another embodiment, in step 210, the base station sets a timer after sending the DCD/UCD message, if the base station has not received any acknowledgement header when the timer is out, it should resend the DCD/UCD message.

Step 230, after receiving the acknowledgement sent by the relay station, through an RS_BW_ALLOC_IE message in the relay MAP, the base station periodically indicates the relay station to send resource blocks used by the DCD/UCD on the downlink.

If the "configuration change counting" field in the DCD/UCD message does not change, the base station will initiatively allocate a downlink bandwidth to the relay station according to the time interval at which the relay station sending the DCD/UCD message, and the relay station uses the bandwidth to broadcast its stored DCD/UCD messages. If the "configuration change counting" field in the DCD/UCD message changes, the base station will regenerate a DCD/UCD message to send to the relay station (namely re-executing the step 210).

The DCD/UCD message is taken for example in the above embodiment, and as to other messages such as MOB_NBR-ADV, which are also broadcasted by the above method, which is not to be illustrated hereby.

In order to adapt to the method of transmitting DCD/UCD broadcast messages of a relay station mentioned in the above embodiment, modifications made to an RS_BW-ALLOC_IE are shown in table 3. As a type of R-link Specific IE( ), the RS_BW-ALLOC_IE( ) is included in an RS_RLY_MAP message. The RS_BW-ALLOC_IE defined in the IEEE802.16j_D2 protocol is used only to allocate the bandwidth to the relay station on a downlink access link. In this paper, new fields are added to the IE, so that the base station is capable of allocating the bandwidth to the relay station on the downlink access link and the downlink relay link for transmitting relay station broadcast messages, and the base station is set to periodically send the RS_BW-ALLOC_IE so that it is not necessary for the relay station to send any bandwidth request.

TABLE 3

Modifications made to the RS_BW-ALLOC_IE in IEEE802.16j_D2 version

| Name | Length | Description |
|---|---|---|
| RS_BW-ALLOC_IE{ | | |
| Type | 5 bits | RS_BW-ALLOC_IE = 0x01 |
| Length | 4 bits | Changeable |
| RCID_IE( ) | 4, 8, 12, 16 bits | Basic CID of the relay station in RCID_ID |
| Type | 2 bits | 0b00: response to a bandwidth request header of the relay station<br>0b01: the relay station locally broadcasts RNG-RSP<br>0b10: the base station initiatively allocates the downlink bandwidth for the relay station<br>0b11: reserved |
| If (type==0x00) { | | |
| TID | 4 bits | Transaction ID |
| }if(type==0x01) { | | |
| Frame number | 4 bits | Low-4 bits of a relative frame number |
| Number of rejected terminals | 4 bits | The number of rejected terminals (for example: RNG-RSP messages with status "suspension") |
| INC_RNG_SUC | 1 bit | Whether the bandwidth allocated to the RNG-RSP message with status "success" is included.<br>(0b0: no; 0b1: yes) |
| INC_DFO | 1 bit | — |
| } | | |
| DL-MAP IE index number | 8 bits | After receiving this IE, the relay station should send messages in the burst indicated by the $k^{th}$ DL-MAP IE message of the DL-MAP messages in the next available frame; wherein the k is the index number of the DL-MAP IE. |
| If (type==0b10){ | | |
| Type of the sent message | 3 bits | 0b000: DCD<br>0b001: UCD<br>0b010: MOB_NBR-ADV<br>0b011-0b111: reserved |

TABLE 3-continued

Modifications made to the RS_BW-ALLOC_IE in IEEE802.16j_D2 version

| Name | Length | Description |
|---|---|---|
| DL-MAP IE index number "k" | 8 bits | After receiving this IE, the relay station should send messages in the burst indicated by the $k^{th}$ DL-MAP IE message of the DL-MAP messages in the next available frame. The frame number of the next available frame is defined in the RS_RLY_MAP message. |
| R-DL-MAP IE index number "k" | 8 bits | After receiving this IE, the relay station should send messages in the burst indicated by the $k^{th}$ R-DL-MAP IE message of the R-DL-MAP messages in the next available frame. The frame number of the next available frame is defined in the RS_RLY_MAP message. |
| } | | |

A new message type is added in the RS_BW_ALLOC_IE, (the 0b10, as shown in table 3); if the message type is 0b10, it means that the IE is used for the situation that the base station allocates the bandwidth to the relay station downlink initiatively and periodically.

When the message type is 0b10, the RS_BW_ALLOC_IE further includes the following information: the sent message type, the index number of the DL-MAP IE (downlink mapping message indicating element) and the index number of the R-DL-MAP IE, wherein:

the "sent message type" field is used to inform the relay station of the type of the sent message that is to be broadcasted in the allocated resource block, the message can be a DCD message or a UCD message, or an MOB_NBR-ADV message, and etc.;

the "DL-MAP IE index number" field denotes the DL-MAP IE that allocates the bandwidth to the downlink access link of the relay station; after receiving this field, the relay station should send messages to the terminal in the burst indicated by the $k^{th}$ DL-MAP IE message of the DL-MAP messages in the next available frame, and the frame number of the next available frame is defined in the RS_RLY_MAP message;

the "R-DL-MAP IE index number" field denotes the R-DL-MAP IE that allocates the bandwidth to the downlink access link of the relay station; after receiving this field, the relay station should send messages to the terminal in the burst indicated by the $k^{th}$ R-DL-MAP IE message of the R-DL-MAP messages in the next available frame, and the frame number of the next available frame is defined in the RS_RLY_MAP message.

The above descriptions are just embodiments of the present invention, but are not used to limit the present invention, and to those skilled in the art, various modifications and changes can be made to the present invention. Any modification, equivalent substitute and improvement within the spirit of the present invention should be included in the protection scope of the claims of the present invention.

For instance, besides the RS_BW_ALLOC_IE message, similar modifications can also be made to other messages, which are then taken as messages indicating the bandwidth allocation of the downlink.

For instance, the broadcast messages mentioned above are not limited to the DCD/UCD message or the MOB_NBR-ADV message, but can be other broadcast messages.

Industrial Applicability

By adopting the method of the present invention, the overhead brought by the relay station when it sends management messages such as the DCD/UCD can be reduced, and it can be guaranteed that the bandwidth for sending these management messages can be allocated in time, thus the time delay is reduced.

What is claimed is:

1. A broadcast message transmission method of a relay station in a multi-hop relay network, applied in a non-transparent centralized scheduling multi-hop relay network, comprising:

sending, by a base station, a message to be broadcasted to a relay station, the relay station returning an acknowledgement header to the base station after receiving the message;

sending, by the base station, a message that indicate the bandwidth allocation of downlink to the relay station periodically after receiving the acknowledgement header, the message being used to indicate the downlink bandwidth that the base station allocates initiatively to the relay station; and the message that indicate the bandwidth allocation of the downlink further includes one or both of the following fields:

a Downlink(DL)-MAP IE index number, used to indicate a position of a burst where the broadcast message sent to the terminal by the relay station is located; and an R-DL-MAP IE index number, used to indicate a position of a burst where the broadcast message sent to the lower relay station by the relay station is located;

sending, by the relay station, broadcast messages to a terminal or a lower relay station within the downlink bandwidth.

2. The method according to claim 1, wherein, the sending, by the base station, messages indicating the bandwidth allocation of downlink to the relay station periodically after receiving the acknowledgement header comprises:

after receiving the acknowledgement header, allocating, by the base station, the downlink bandwidth to the relay station, and sending, by the base station, messages indicating the bandwidth allocation of the downlink to the relay station periodically according to a periodical sending interval at which the relay station sends broadcast messages, wherein the periodical sending interval at which the relay station broadcasts messages is defined during initial setting of the relay station or is informed to the base station during basic capability negotiation.

3. The method according to claim 2, wherein,
the message indicating the bandwidth allocation of the downlink is an RS_BW_ALLOC_IE message.

4. The method according to claim 2, wherein,
the broadcast message includes any one or several of the following messages:
a DCD message, or a UCD message, or an MOP_NBR-ADV message.

5. The method according to claim 1, wherein,
the acknowledgement header returned to the base station by the relay station includes message types and configuration change counting values, if the base station finds that the broadcast message of the relay station is changed or the base station does not receive any acknowledgement header within a predefined time, the base station will resend a message to be broadcasted to the relay station.

6. The method according to claim 5, wherein,
the message indicating the bandwidth allocation of the downlink is an RS_BW_ALLOC_IE message.

7. The method according to claim 5, wherein,
the broadcast message includes any one or several of the following messages:
a DCD message, or a UCD message, or an MOP_NBR-ADV message.

8. The method according to claim 1, wherein,
a type indicator is added to the message indicating the bandwidth allocation of the downlink, and is used to denote that the message has indicated the downlink bandwidth allocated initiatively to the relay station by the base station.

9. The method according to claim 8, wherein,
the message indicating the bandwidth allocation of the downlink further includes sent message types, which are used to indicate types of the broadcast messages sent by the relay station within a corresponding downlink bandwidth.

10. The method according to claim 9, wherein,
the message indicating the bandwidth allocation of the downlink is an RS_BW_ALLOC_IE message.

11. The method according to claim 9, wherein,
the broadcast message includes any one or several of the following messages:
a DCD message, or a UCD message, or an MOP_NBR-ADV message.

12. The method according to claim 8, wherein,
the message indicating the bandwidth allocation of the downlink is an RS_BW_ALLOC_IE message.

13. The method according to claim 8, wherein,
the broadcast message includes any one or several of the following messages:
a DCD message, or a UCD message, or an MOP_NBR-ADV message.

14. The method according to claim 1, wherein,
when the DL-MAP IE index number is k, after receiving the message indicating the bandwidth allocation of the downlink, the relay station sends messages in the burst indicated by the $k^{th}$ DL-MAP IE message of DL-MAP messages in the next available frame, and the frame number of the next available frame is defined in an RS_RLY_MAP message.

15. The method according to claim 14, wherein,
the message indicating the bandwidth allocation of the downlink is an RS_BW_ALLOC_IE message.

16. The method according to claim 14, wherein,
the broadcast message includes any one or several of the following messages:
a DCD message, or a UCD message, or an MOP_NBR-ADV message.

17. The method according to claim 1, wherein,
when the R-DL-MAP IE index number is k, after receiving the message indicating the bandwidth allocation of the downlink, the relay station sends messages in the burst indicated by the $k^{th}$ R-DL-MAP IE message of R-DL-MAP messages in a next available frame, and the frame number of the next available frame is defined in an RS_RLY_MAP message.

18. The method according to claim 17, wherein,
the message indicating the bandwidth allocation of the downlink is an RS_BW_ALLOC_IE message.

19. The method according to claim 17, wherein,
the broadcast message includes any one or several of the following messages:
a DCD message, or a UCD message, or an MOP_NBR-ADV message.

20. The method according to claim 1, wherein,
the message indicating the bandwidth allocation of the downlink is an RS_BW_ALLOC_IE message.

21. The method according to claim 1, wherein,
the broadcast message includes any one or several of the following messages:
a DCD message, or a UCD message, or an MOP_NBR-ADV message.

* * * * *